US012689396B2

(12) United States Patent 
Miura et al.

(10) Patent No.: US 12,689,396 B2 
(45) Date of Patent: Jul. 21, 2026

(54) RADIO FREQUENCY MODULE AND COMMUNICATION DEVICE

(71) Applicant: Murata Manufacturing Co., Ltd., Nagaokakyo (JP)

(72) Inventors: Masanari Miura, Nagaokakyo (JP); 
Hiroyuki Nagamori, Nagaokakyo (JP); 
Hiromichi Kitajima, Nagaokakyo (JP); 
Takahiro Katamata, Nagaokakyo (JP); 
Shogo Yanase, Nagaokakyo (JP); 
Kouichi Ueno, Nagaokakyo (JP); 
Hiroyuki Kani, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 302 days.

(21) Appl. No.: 18/619,172

(22) Filed: Mar. 28, 2024

(65) Prior Publication Data

US 2024/0364368 A1 Oct. 31, 2024

(30) Foreign Application Priority Data

Apr. 27, 2023 (JP) ................................. 2023-072951

(51) Int. Cl. 
*H04B 1/00* (2006.01) 
*H04B 1/04* (2006.01) 
*H04B 1/10* (2006.01)

(52) U.S. Cl. 
CPC ......... *H04B 1/0078* (2013.01); *H04B 1/0483* (2013.01); *H04B 1/10* (2013.01)

(58) Field of Classification Search 
CPC ...... H04B 1/0078; H04B 1/0483; H04B 1/10; H04B 1/0057; H04B 1/006; H04B 1/40; H04B 1/401 
See application file for complete search history.

(56) References Cited

U.S. PATENT DOCUMENTS

2017/0302317 A1* 10/2017 Horita ..................... H04B 1/00 
2020/0403651 A1* 12/2020 Obiya .................. H04B 1/0057 
2021/0013909 A1* 1/2021 Ono ......................... H04B 1/40

FOREIGN PATENT DOCUMENTS

JP 2020-530679 A 10/2020

* cited by examiner

*Primary Examiner* — Fayyaz Alam 
(74) *Attorney, Agent, or Firm* — XSENSUS LLP

(57) ABSTRACT

A radio frequency module that includes a first antenna terminal, a second antenna terminal, a TDD filter, a transmission filter, a filter, and a first switch. The first switch has a first common terminal, a second common terminal, a first terminal, a second terminal, and a third terminal. The filter is connected to the first terminal, the TDD filter is connected to the second terminal, and the transmission filter is connected to the third terminal. The first switch is capable of switching between a first connection state and a second connection state. The first connection state connects the first common terminal to the first terminal and the first common terminal to the second terminal simultaneously. The second connection state connects the first common terminal to the first terminal, the first common terminal to the second terminal, and the second common terminal to the third terminal simultaneously.

20 Claims, 9 Drawing Sheets

RADIO FREQUENCY MODULE AND COMMUNICATION DEVICE

CROSS-REFERENCE TO RELATED APPLICATION

This application claims priority to Japanese Patent Application No. JP 2023-072951 filed on Apr. 27, 2023. The entire contents of the above-identified applications, including the specifications, drawings and claims, are incorporated herein by reference in their entirety.

BACKGROUND OF THE DISCLOSURE

1. Field of the Disclosure

The present disclosure relates to radio frequency modules and communication devices.

2. Description of the Related Art

A device described in Japanese Unexamined Patent Application Publication (Translation of PCT Application) No. 2020-530679 includes a FDD (Frequency Division Duplex)-and-TDD (Time Division Duplex) filter, a first antenna, a second antenna, and an antenna switch. The foregoing FDD-and-TDD filter is a filter that combines a FDD duplexer and a TDD filter. The foregoing antenna switch is connected to the foregoing FDD-and-TDD filter, the foregoing first antenna, and the foregoing second antenna. The antenna switch is capable of forming the connection between the foregoing FDD-and-TDD filter and the foregoing first antenna and the connection between the foregoing FDD-and-TDD filter and the foregoing second antenna simultaneously.

SUMMARY OF THE DISCLOSURE

However, with the foregoing prior art technique, in some cases, during simultaneous communication with SRS (Sounding Reference Signal) and a normal radio frequency signal, throughput of communication with the normal radio frequency signal may decrease.

In view of the above, an object of the present disclosure is to provide a radio frequency module and a communication device, each of which is capable of suppressing the decrease in the throughput of communication with a normal radio frequency signal.

A radio frequency module according to one aspect of the present disclosure includes a first antenna terminal, a second antenna terminal, a TDD filter, a transmission filter, a filter, and a first switch. The TDD filter includes a pass band of a first band. The filter includes a pass band of a second band that is different from the TDD filter and the transmission filter. The first switch has a first common terminal, a second common terminal, a first terminal, a second terminal, and a third terminal. The first common terminal is connected to the first antenna terminal. The second common terminal is connected to the second antenna terminal. The first terminal is connectable to the first common terminal. The second terminal is connectable to the first common terminal and the second common terminal. The third terminal is connectable to the second common terminal. The filter is connected to the first terminal. The TDD filter is connected to the second terminal. The transmission filter is connected to the third terminal. The first switch is configured to be able to switch between a first connection state and a second connection state. The first connection state connects the first common terminal to the first terminal and the first common terminal to the second terminal simultaneously. The second connection state connects the first common terminal to the first terminal, the first common terminal to the second terminal, and the second common terminal to the third terminal simultaneously. The transmission filter includes a pass band of the first band.

A radio frequency module according to one aspect of the present disclosure includes a first antenna terminal, a second antenna terminal, a TDD filter, a transmission filter, a filter, and a first switch. The TDD filter includes a pass band of a first band. The filter includes a pass band of a second band that is different from the TDD filter and the transmission filter. The first switch has a first common terminal, a second common terminal, a first terminal, and a second terminal. The first common terminal is connected to the first antenna terminal. The second common terminal is connected to the second antenna terminal. The first terminal is connectable to the first common terminal. The second terminal is connectable to the second common terminal. The filter and the TDD filter are connected to the first terminal. The transmission filter is connected to the second terminal. The first switch is configured to be able to switch between a first connection state and a second connection state. The first connection state connects the first common terminal to the first terminal. The second connection state connects the first common terminal to the first terminal and the second common terminal to the second terminal simultaneously. The transmission filter includes a pass band of the first band.

A communication device according to one aspect of the present disclosure includes the radio frequency module and a signal processing circuit. The signal processing circuit is connected to the radio frequency module and performs signal processing on a radio frequency signal.

The radio frequency module and the communication device according to the present disclosure have an advantageous effect of suppressing the decrease in the throughput of communication with a normal radio frequency signal.

BRIEF DESCRIPTION OF THE DRAWINGS

FIG. 2 is a configuration diagram illustrating operation of the radio frequency module described above assuming communication with a normal radio frequency signal is performed and operation thereof assuming SRS is transmitted from a first antenna;

FIG. 3 is a configuration diagram illustrating operation of the radio frequency module described above assuming SRS is transmitted from a second antenna;

FIG. 5 is a configuration diagram of a radio frequency module and a communication device according to a modified example 1 of the embodiment 1;

FIG. 6 is a configuration diagram of a radio frequency module and a communication device according to an embodiment 2;

FIG. 7 is a configuration diagram illustrating operation of the radio frequency module described above assuming communication with a normal radio frequency signal is performed and operation thereof assuming SRS is transmitted from the first antenna;

FIG. 8 is a configuration diagram illustrating operation of the radio frequency module described above assuming SRS is transmitted from the second antenna; and FIG. 9 is a configuration diagram illustrating operation of the radio frequency module described above assuming SRS is transmitted from the third antenna.

DESCRIPTION OF THE EMBODIMENTS

Embodiment 1

Hereinafter, a communication device 100 including a radio frequency module according to the embodiment 1 is described with reference to the drawings.

(1) Outline

A radio frequency module 1 according to the embodiment 1 is configured in such a way that upon reception of a transmission request of SRS (Sounding Reference Signal) from a communication counterpart (for example, a base station), SRS is transmitted to the communication counterpart from each of all the antennas available for communication with the communication counterpart sequentially. Moreover, the radio frequency module 1 is configured in such a way that normal communication and the transmission of SRS can be performed simultaneously assuming a transmission request of SRS is received during the normal communication. Note that the foregoing "normal communication" is defined to mean transmission or reception of a signal other than SRS.

Figure 1:
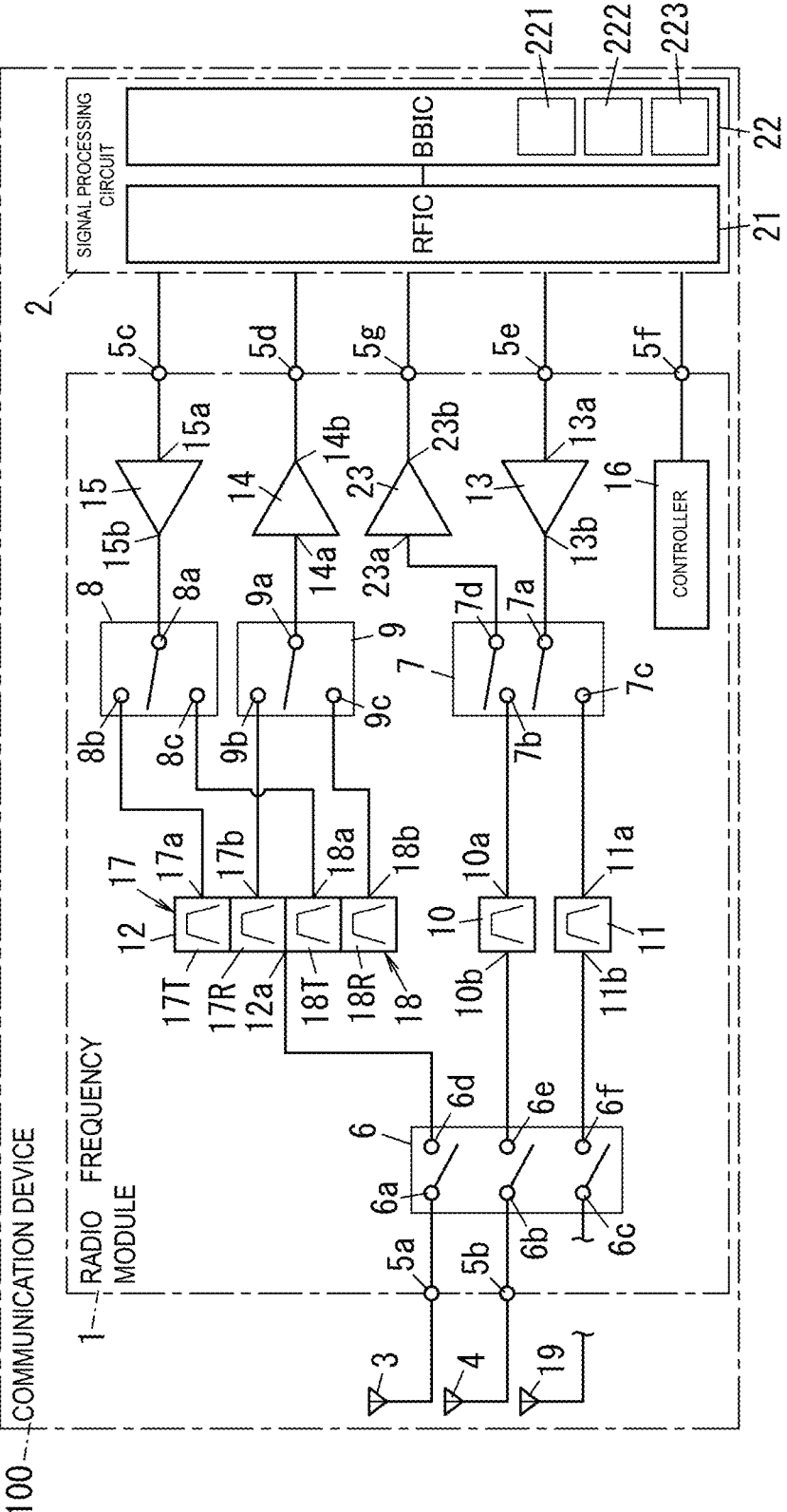
FIG. 1 is a configuration diagram of a radio frequency module and a communication device according to an embodiment 1.

As illustrated in FIG. 1, the radio frequency module 1 according to the embodiment 1 includes a first antenna terminal 5a, a second antenna terminal 5b, a TDD (Time Division Duplex) filter 10, a transmission filter 11, a filter 12, and a first switch 6. The TDD filter 10 includes a pass band of a first band. The filter 12 includes a pass band of a second band that is different from the TDD filter 10 and the transmission filter 11. The first switch 6 has a first common terminal 6a, a second common terminal 6b, a first terminal 6d, a second terminal 6e, and a third terminal 6f. The first common terminal 6a is connected to the first antenna terminal 5a. The second common terminal 6b is connected to the second antenna terminal 5b. The first terminal 6d is connectable to the first common terminal 6a. The second terminal 6e is connectable to the first common terminal 6a and the second common terminal 6b. The third terminal 6f is connectable to the second common terminal 6b. The filter 12 is connected to the first terminal 6d. The TDD filter 10 is connected to the second terminal 6e. The transmission filter 11 is connected to the third terminal 6f. The first switch 6 is configured to be able to switch between a first connection state and a second connection state. The first connection state connects the first common terminal 6a to the first terminal 6d and the first common terminal 6a to the second terminal 6e simultaneously. The second connection state connects the first common terminal 6a to the first terminal 6d, the first common terminal 6a to the second terminal 6e, and the second common terminal 6b to the third terminal 6f simultaneously.

According to this configuration, at the time of outputting SRS from each of the first common terminal 6a and the second common terminal 6b sequentially, first, with the first connection state of the first switch 6, SRS is output to the first common terminal 6a from the TDD filter 10 via the first switch 6. Then, next, with the second connection state of the first switch 6, SRS is output to the second common terminal

6b from the transmission filter 11 via the first switch 6. At this time, in the first switch 6, in any of the first connection state and the second connection state, the connection between the first common terminal 6a and the first terminal 6d and the connection between the first common terminal 6a and the second terminal 6e are formed simultaneously. That is to say, in any of the first connection state and the second connection state of the first switch 6, the filter 12 is connected to the first antenna 3, which is connected to the first common terminal 6a, and the TDD filter 10, which is connected to the second terminal 6e. Because of this, in any of the first connection state and the second connection state of the first switch 6, the load connected to the filter 12 (the first antenna 3 connected to the first common terminal 6a and the TDD filter 10 connected to the second terminal 6e) is the same. Accordingly, at the time of outputting SRS from each of the first common terminal 6a and the second common terminal 6b sequentially, the load variation of the filter 12 can be suppressed. As a result, even assuming the transmission of SRS and the normal communication (communication using a signal path that connects the filter 12 to the first common terminal 6a) are performed simultaneously, in the normal communication, performance loss (for example, a decrease in throughput) caused by the load variation of the filter 12 can be suppressed. That is to say, the decrease in the throughput of communication with a normal radio frequency signal can be suppressed.

(2) Configuration of Communication Device 100

As illustrated in FIG. 1, the communication device 100 is a communication device including the radio frequency module 1. The communication device 100 is, for example, a mobile terminal (for example, a smartphone). However, the communication device 100 is not limited thereto and may be, for example, a wearable terminal (for example, a smart watch). The radio frequency module 1 is, for example, a module compatible with the 4G (fourth generation mobile telecommunications) standard and the 5G (fifth generation mobile telecommunications) standard. The 4G standard is, for example, the 3GPP (Registered trademark, Third Generation Partnership Project) or the LTE standard (Registered trademark, Long Term Evolution). The 5G standard is, for example, the 5G NR (New Radio). The radio frequency module 1 is a module compatible with carrier aggregation and dual connectivity.

The communication device 100 includes, in addition to the radio frequency module 1, a signal processing circuit 2 and one or more (for example, three) antennas (a first antenna 3, a second antenna 4, and a third antenna 19). The first antenna 3 and the second antenna 4 are directly connected to the radio frequency module 1. The third antenna 19 is connected to the radio frequency module 1 via another circuit board that is a circuit board included in the communication device 100 but different from the radio frequency module 1.

The radio frequency module 1 is configured in such a manner as to amplify a transmission signal (radio frequency signal) output from the signal processing circuit 2 and transmit the amplified transmission signal from the first antenna 3, the second antenna 4, or the third antenna 19. Further, the radio frequency module 1 is configured in such a manner as to amplify a reception signal (radio frequency signal) received by the first antenna 3, the second antenna 4, or the third antenna 19 and output the amplified reception signal to the signal processing circuit 2. The radio frequency module 1 is controlled, for example, by the signal processing circuit 2.

The signal processing circuit 2 is connected to the radio frequency module 1 and is configured in such a manner as to perform signal processing on a transmission signal to be output to the radio frequency module 1 or perform signal processing on a reception signal output from the radio frequency module 1. The signal processing circuit 2 includes a RF (Radio Frequency) signal processing circuit 21 and a base band signal processing circuit 22.

The RF signal processing circuit 21 is, for example, a RFIC (Radio Frequency Integrated Circuit) and performs signal processing on radio frequency signals (a transmission signal and a reception signal). The RF signal processing circuit 21 performs signal processing on a reception signal output from the radio frequency module 1 using down-converting and the like and outputs a processed signal to the base band signal processing circuit 22. Further, the RF signal processing circuit 21 performs signal processing on a transmission signal output from the base band signal processing circuit 22 using up-converting and the like and outputs a processed signal to the radio frequency module 1.

The base band signal processing circuit 22 is, for example, a BBIC (Baseband Integrated Circuit). The base band signal processing circuit 22 outputs a reception signal output from the RF signal processing circuit 21 to the outside. This output signal (reception signal) is used, for example, as an image signal for image display or as an audio signal for calls. Further, the base band signal processing circuit 22 generates a transmission signal from a base band signal (for example, an audio signal or an image signal) input from the outside and outputs a generated transmission signal to the RF signal processing circuit 21.

The base band signal processing circuit 22 has a determination part 221, a SRS generation part 222, and a transmission control part 223.

The determination part 221 determines whether or not a reception signal received by the radio frequency module 1 is a SRS request signal. The SRS request signal is a signal requesting transmission of SRS to the source of this SRS request signal.

Assuming the determination part 221 determines that the reception signal is the SRS request signal, the SRS generation part 222 generates SRS and outputs a generated SRS to the radio frequency module 1 via the RF signal processing circuit 21.

The transmission control part 223 controls the first switch 6 and a second switch 7 via a controller 16 of the radio frequency module 1 in such a way that SRS, which is output from the signal processing circuit 2 to the radio frequency module 1, is transmitted from each of the first antenna 3, the second antenna 4, and the third antenna 19 sequentially.

Note that in the embodiment 1, the determination part 221, the SRS generation part 222, and the transmission control part 223 are arranged in the signal processing circuit 2. However, the determination part 221, the SRS generation part 222, and the transmission control part 223 may alternatively be arranged in a processing circuit that follows the signal processing circuit 2. Further, the determination part 221 and the transmission control part 223 may alternatively be arranged in the controller 16, which will be described later.

(3) Description of Configuration of Radio Frequency Module

As illustrated in FIG. 1, the radio frequency module 1 includes, for example, a plurality of external terminals 5a to 5g, the first switch 6, the second switch 7, a third switch 8, a fourth switch 9, the TDD filter 10, the transmission filter 11, the filter 12, a first power amplifier 13, a first low-noise amplifier 14, a second power amplifier 15, a second low-noise amplifier 23, and the controller 16. The second switch 7, the third switch 8, the fourth switch 9, the first power amplifier 13, the first low-noise amplifier 14, and the second power amplifier 15 are some examples of the constituent elements, and the constituent elements are not limited thereto.

The external terminal 5a is the first antenna terminal to be connected to the first antenna 3. The external terminal 5b is the second antenna terminal to be connected to the second antenna 4. In the following description, in some cases, the external terminal 5a is described as the first antenna terminal 5a, and the external terminal 5b is described as the second antenna terminal 5b. The external terminal 5c is connected to an output part of the signal processing circuit 2 and is an input terminal to which a transmission signal output from the output part of the signal processing circuit 2 is input. The external terminal 5d is connected to an input part of the signal processing circuit 2 and is an output terminal that outputs a reception signal processed in the radio frequency module 1 to the input part of the signal processing circuit 2. The external terminal 5e is connected to the output part of the signal processing circuit 2 and is an input terminal to which a transmission signal or SRS output from the output part of the signal processing circuit 2 is input. The external terminal 5f is connected to a signal output part of the signal processing circuit 2 and is an input terminal for receiving a control signal for controlling the controller 16 from the signal processing circuit 2. The external terminal 5g is connected to the input part of the signal processing circuit 2 and is an output terminal that outputs a reception signal processed in the radio frequency module 1 to the input part of the signal processing circuit 2.

The first switch 6 is a switch for selecting one or two of the first antenna 3 and the second antenna 4 to use and connecting the selected antenna or antennas to the TDD filter 10, the transmission filter 11, or the filter 12. The first switch 6 is controlled by a control signal from the controller 16. The first switch 6 is, for example, a switch IC (Integrated Circuit).

The first switch 6 has the first common terminal 6a, the second common terminal 6b, a third common terminal 6c, the first terminal 6d, the second terminal 6e, and the third terminal 6f. The first common terminal 6a, the second common terminal 6b, and the third common terminal 6c are, for example, common terminals, and the first terminal 6d, the second terminal 6e, and the third terminal 6f are, for example, selection terminals.

Each of the first common terminal 6a, the second common terminal 6b, and the third common terminal 6c is selectively connected to one of the first terminal 6d, the second terminal 6e, and the third terminal 6f, or is simultaneously connected two or more of the first terminal 6d, the second terminal 6e, and the third terminal 6f. More specifically, the first switch 6 is configured to be able to switch between the first connection state, the second connection state, and a third connection state. The first connection state is the connection state in which the connection between the first common terminal 6a and the first terminal 6d and the connection between the first common terminal 6a and the second terminal 6e are formed simultaneously (see FIG. 2). The second connection state is the connection state in which the connection between the first common terminal 6a and the first terminal 6d, the connection between the first common terminal 6a and the second terminal 6e, and the connection between the second common terminal 6b and the third terminal 6f are formed simultaneously (see FIG. 3). The third connection state is the connection state in which the connection between the first common terminal 6a and the first terminal 6d, the connection between the first common terminal 6a and the second terminal 6e, and the connection between the third common terminal 6c and the third terminal 6f are formed simultaneously (see FIG. 4).

The first common terminal 6a is connected to the external terminal (first antenna terminal) 5a and further connected to the first antenna 3 via the external terminal 5a. The second common terminal 6b is connected to the external terminal (second antenna terminal) 5b and further connected to the second antenna 4 via the external terminal 5b. The third common terminal 6c is a SRS output terminal and is connected to a SRS input terminal provided on another circuit board that is different from the radio frequency module 1. The foregoing another circuit board may be a module that is different from the radio frequency module 1 and is included in the communication device 100, or a mount board (for example, a mother board) on which the radio frequency module 1 is mounted. By being connected to the SRS input terminal of the foregoing another circuit board, the third common terminal 6c is connected to the third antenna 19 that is connected to the foregoing another circuit board. The first terminal 6d is connected to an input/output part 12a of the filter 12. The first terminal 6d is connectable to the first common terminal 6a. The second terminal 6e is connected to an input/output part 10b of the TDD filter 10. The second terminal 6e is connectable to the first common terminal 6a and the second common terminal 6b. The third terminal 6f is connected to an output part 11b of the transmission filter 11. The third terminal 6f is connectable to the second common terminal 6b.

Note that as in the case of the third common terminal 6c, each of the first common terminal 6a and the second common terminal 6b may alternatively be used as the SRS output terminal and be connected to an antenna that is connected to another circuit board. Further, as in the case of the first common terminal 6a and the second common terminal 6b, the third common terminal 6c may alternatively be connected to the antenna (the first antenna 3 or the second antenna 4) provided in the radio frequency module 1. That is to say, the first common terminal 6a, the second common terminal 6b, and the third common terminal 6c may each be connected to an antenna that is connected to the radio frequency module 1 or an antenna that is connected to the foregoing another circuit board.

The second switch 7 is a switch for selecting one of the TDD filter 10 and the transmission filter 11 as an output destination of the first power amplifier 13 and connecting the first power amplifier 13 to an input part of the selected filter. Further, the second switch 7 is a switch for selectively connecting an receiving end of input of the second low-noise amplifier 23 to an input/output part 10a of the TDD filter 10. The second switch 7 is controlled by a control signal from the controller 16. The second switch 7 is, for example, a switch IC. The second switch 7 has common terminals 7a and 7d and a plurality (two in the example of FIG. 1) of selection terminals 7b and 7c. The common terminal 7a is selectively connected to one of the plurality of selection terminals 7b and 7c. The common terminal 7a is connected to an output part 13b of the first power amplifier 13. The common terminal 7d is selectively connected to the selection terminal 7b. The common terminal 7d is connected to an input part 23a of the second low-noise amplifier 23. The selection terminal 7b is connected to the input/output part 10a of the TDD filter 10. The selection terminal 7c is connected to an input part 11a of the transmission filter 11.

The third switch 8 is a switch for selecting one of transmission filters 17T and 18T as an output destination of the second power amplifier 15. The third switch 8 is controlled by a control signal from the controller 16. The third switch 8 is, for example, a switch IC. The third switch 8 has a common terminal 8a and a plurality (two in the example of FIG. 1) of selection terminals 8b and 8c. The common terminal 8a is selectively connected to one of the plurality of selection terminals 8b and 8c. The common terminal 8a is connected to an output part 15b of the second power amplifier 15. The selection terminal 8b is connected to an input part 17a of the transmission filter 17T. The selection terminal 8c is connected to an input part 18a of the transmission filter 18T.

The fourth switch 9 is a switch for selecting one of reception filters 17R and 18R as an receiving end of input of the first low-noise amplifier 14. The fourth switch 9 is controlled by a control signal from the controller 16. The fourth switch 9 is, for example, a switch IC. The fourth switch 9 has a common terminal 9a and a plurality (two in the example of FIG. 1) of selection terminals 9b and 9c. The common terminal 9a is selectively connected to one of the plurality of selection terminals 9b and 9c. The common terminal 9a is connected to an input part 14a of the first low-noise amplifier 14. The selection terminal 9b is connected to an output part 17b of the reception filter 17R. The selection terminal 9c is connected to an output part 18b of the reception filter 18R.

The TDD filter 10 is a filter having the capability of transmission and reception. The TDD filter 10 is used for the normal communication and the transmission of SRS. The foregoing "normal communication" is defined to mean communication during which a signal other than SRS is transmitted or received. The TDD filter 10 is a transmission-and-reception filter whose pass bands are transmission and reception bands of the first band (for example, B (band) n41, n40, n77, or n79). The TDD filter 10 has the input/output part 10a and the input/output part 10b. The input/output part 10a is connected to the selection terminal 7b of the second switch 7. The input/output part 10b is connected to the second terminal 6e of the first switch 6. The TDD filter 10 receives a signal, which is output from the selection terminal 7b of the second switch 7, from the input/output part 10a, allows a signal of the transmission band of the first band to pass by restricting the input signal, and outputs the signal allowed to pass through from the input/output part 10b. Further, the TDD filter 10 receives a signal, which is output from the second terminal 6e of the first switch 6, from the input/output part 10b, allows a signal of the reception band of the first band to pass by restricting the input signal, and outputs the signal allowed to pass through from the input/output part 10a.

The transmission filter 11 is a transmission filter for transmitting SRS. The transmission filter 11 is a transmission filter that has a pass band including the first band, which is the same band as the band of a transmission signal that passes the TDD filter 10. The transmission filter 11 has the input part 11a and the output part 11b. The input part 11a is connected to the selection terminal 7c of the second switch 7. The output part 11b is connected to the third terminal 6f of the first switch 6. The transmission filter 11 receives a signal, which is output from the selection terminal 7c of the second switch 7, from the input part 11a, allows a signal of the transmission band of the first band to pass by restricting the input signal, and outputs the signal allowed to pass through from the output part 11*b*.

The filter 12 is a FDD (Frequency Division Duplex) filter having transmission capability and reception capability. The filter 12 includes a pass band of the second band that is different from the band (first band) of the TDD filter 10 and the transmission filter 11. The filter 12 has, for example, the duplexers 17 and 18, the input/output part 12*a*, the input parts 17*a* and 18*a*, and the output parts 17*b* and 18*b*.

The duplexer 17 has the transmission filter 17T and the reception filter 17R. The transmission filter 17T is a transmission filter whose pass band is a transmission band of a band (for example, B (Band) 1) that is different from the first band. The reception filter 17R is a reception filter whose pass band is a reception band of the foregoing band (second band) that is different from the first band. The transmission filter 18T is a transmission filter whose pass band is a transmission band of a band (for example, B (Band) 3) (second band) that is different from the first band and the foregoing band. The reception filter 18R is a reception filter whose pass band is a reception band of the foregoing band (for example, B (Band) 3). The input/output part 12*a* functions as the output part of the transmission filters 17T and 18T and further functions as the input part of the reception filters 17R and 18R. The input parts 17*a* and 18*a* function as the input parts of the transmission filters 17T and 18T. The output parts 17*b* and 18*b* function as the output parts of the reception filters 17R and 18R.

The transmission filter 17T has the input part 17*a* and the output part (input/output part 12*a*). The input part 17*a* is connected to the selection terminal 8*b* of the third switch 8. The output part (input/output part 12*a*) is connected to the first terminal 6*d* of the first switch 6. The transmission filter 17T receives a signal, which is output from the selection terminal 8*b* of the third switch 8, from the input part 17*a*, allows a signal of the transmission band of the second band to pass by restricting the input signal, and outputs the signal allowed to pass through from the output part (input/output part 12*a*).

The reception filter 17R has the input part (input/output part 12*a*) and the output part 17*b*. The input part (input/output part 12*a*) is connected to the first terminal 6*d* of the first switch 6. The output part 17*b* is connected to the selection terminal 9*b* of the fourth switch 9. The reception filter 17R receives a signal, which is output from the first terminal 6*d* of the first switch 6, from the input part (input/output part 12*a*), allows a signal of the reception band of the second band to pass by restricting the input signal, and outputs the signal allowed to pass through from the output part 17*b*.

The transmission filter 18T has the input part 18*a* and the output part (input/output part 12*a*). The input part 18*a* is connected to the selection terminal 8*c* of the third switch 8. The output part (input/output part 12*a*) is connected to the first terminal 6*d* of the first switch 6. The transmission filter 18T receives a signal, which is output from the selection terminal 8*c* of the third switch 8, from the input part 18*a*, allows a signal of the transmission band of the third band to pass by restricting the input signal, and outputs the signal allowed to pass through from the output part (input/output part 12*a*).

The reception filter 18R has the input part (input/output part 12*a*) and the output part 18*b*. The input part (input/output part 12*a*) is connected to the first terminal 6*d* of the first switch 6. The output part 18*b* is connected to the selection terminal 9*c* of the fourth switch 9. The reception filter 18R receives a signal, which is output from the first terminal 6*d* of the first switch 6, from the input part (input/output part 12*a*), allows a signal of the reception band of the third band to pass by restricting the input signal, and outputs the signal allowed to pass through from the output part 18*b*.

The first power amplifier 13 is connected between the external terminal 5*e* and the common terminal 7*a* of the second switch 7. The first power amplifier 13 has an input part 13*a* and an output part 13*b*. The input part 13*a* is connected to the external terminal 5*e*. The output part 13*b* is connected to the common terminal 7*a* of the second switch 7. The first power amplifier 13 amplifies a signal input to the input part 13*a* from the external terminal 5*e* and outputs an amplified signal from the output part 13*b* to the common terminal 7*a*.

The first low-noise amplifier 14 is connected between the common terminal 9*a* of the fourth switch 9 and the external terminal 5*d*. The first low-noise amplifier 14 has an input part 14*a* and an output part 14*b*. The input part 14*a* is connected to the common terminal 9*a* of the fourth switch 9. The output part 14*b* is connected to the external terminal 5*d*. The first low-noise amplifier 14 amplifies a signal input to the input part 14*a* from the common terminal 9*a* and outputs an amplified signal from the output part 14*b* to the external terminal 5*d*.

The second power amplifier 15 is connected between the external terminal 5*c* and the common terminal 8*a* of the third switch 8. The second power amplifier 15 has an input part 15*a* and an output part 15*b*. The input part 15*a* is connected to the external terminal 5*c*. The output part 15*b* is connected to the common terminal 8*a* of the third switch 8. The second power amplifier 15 amplifies a signal input to the input part 15*a* from the external terminal 5*c* and outputs an amplified signal from the output part 15*b* to the common terminal 8*a*.

The second low-noise amplifier 23 is connected between the common terminal 7*d* of the second switch 7 and the external terminal 5*g*. The second low-noise amplifier 23 has an input part 23*a* and an output part 23*b*. The input part 23*a* is connected to the common terminal 7*d* of the second switch 7. The output part 23*b* is connected to the external terminal 5*g*. The second low-noise amplifier 23 amplifies a signal input to the input part 23*a* from the common terminal 7*d* and outputs an amplified signal from the output part 23*b* to the external terminal 5*g*.

In accordance with a control signal from the signal processing circuit 2, the controller 16 controls electronic components (for example, the first switch 6, the second switch 7, the third switch 8, the fourth switch 9, the first power amplifier 13, the first low-noise amplifier 14, the second power amplifier 15, and the second low-noise amplifier 23) included in the radio frequency module 1. The controller 16 is electrically connected to the electronic components described above. The controller 16 is connected to the signal output part of the signal processing circuit 2 via the external terminal 5*f*. The controller 16 controls each of the electronic components described above in accordance with a control signal input to the external terminal 5*f* from the signal processing circuit 2.

(4) Description of Operation of Radio Frequency Module 1

Figure 2:
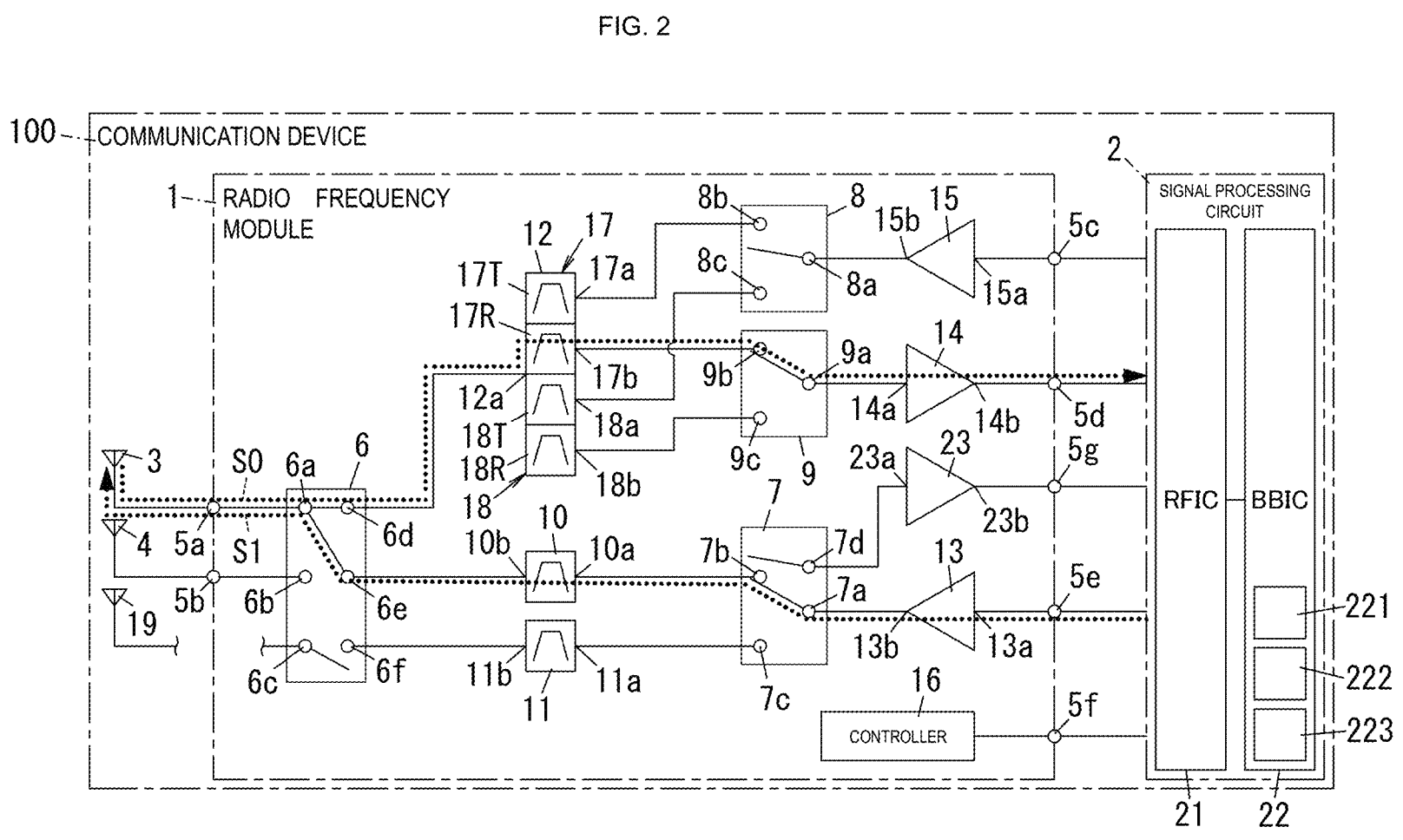
Figure 3:
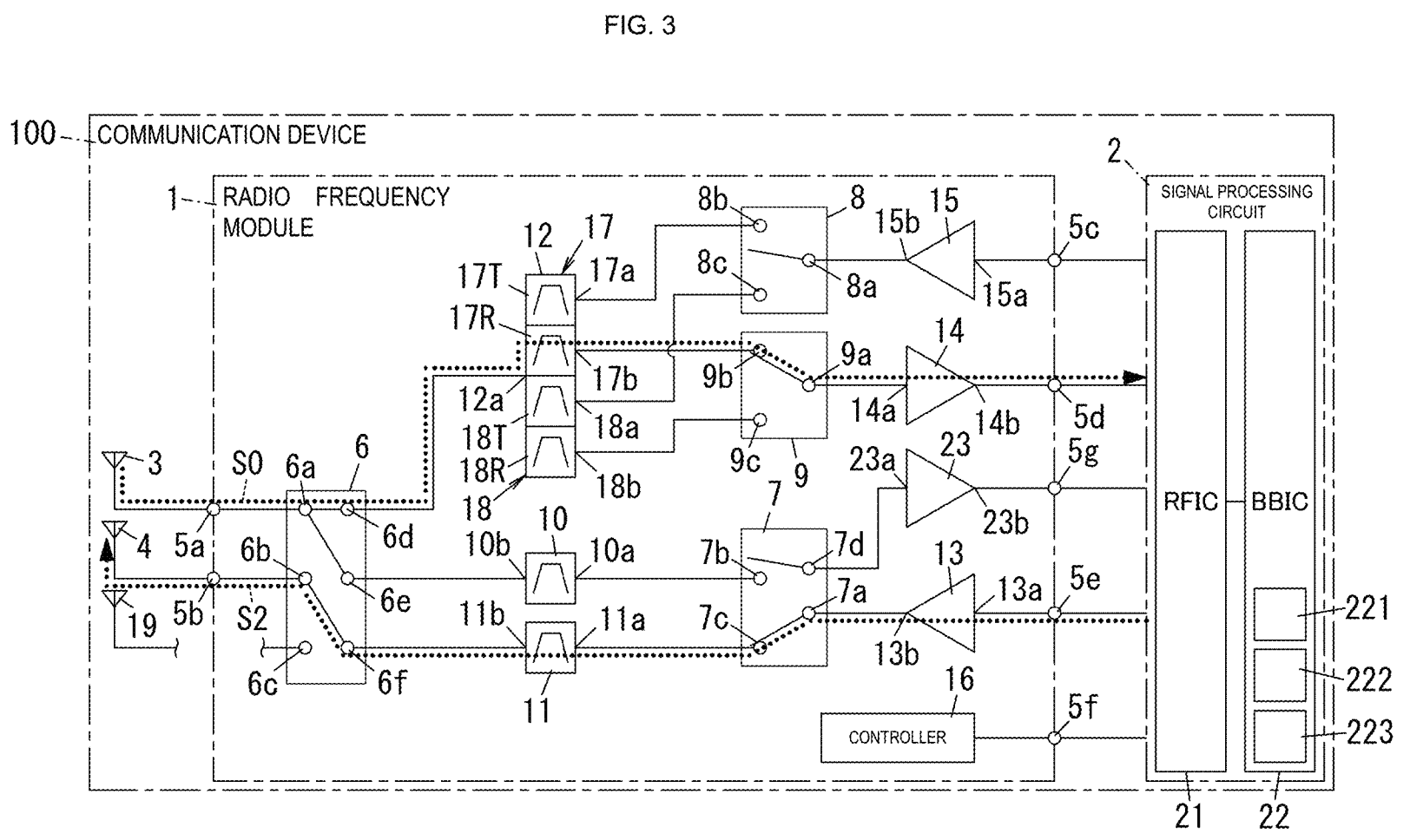
Figure 4:
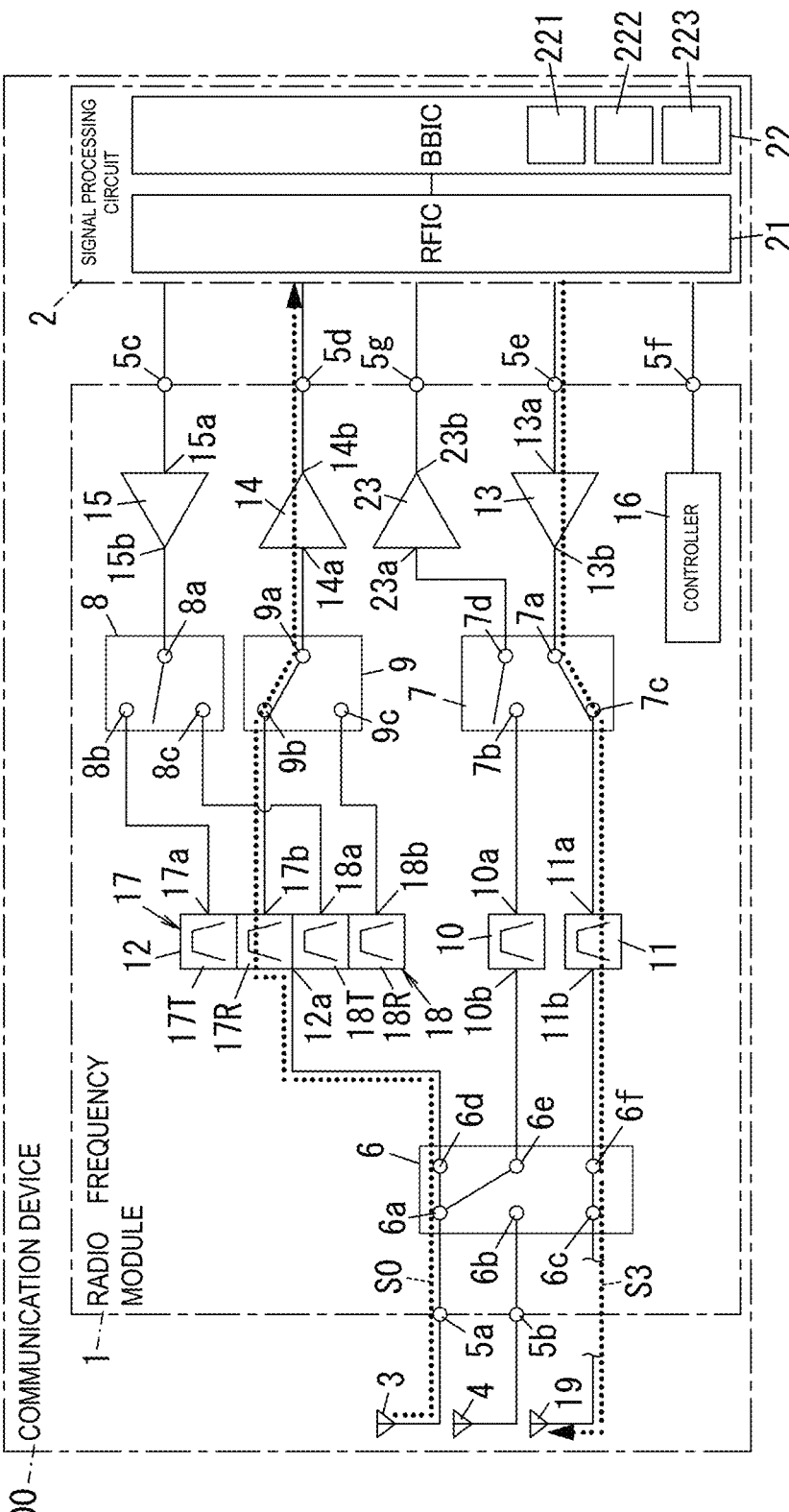
FIG. 4 is a configuration diagram illustrating operation of the radio frequency module described above assuming SRS is transmitted from a third antenna.

Referring to FIG. 2 to FIG. 4, operation of the radio frequency module 1 at the time of transmitting SRS is described.

Referring to FIG. 2, first, an exemplary operation is described for the case where normal transmission and normal reception are performed simultaneously as normal communication. More specifically, the exemplary operation is described for the case where the normal reception using a signal path S0 that goes through the first antenna 3 and the reception filter 17R and the normal transmission using a signal path S1 that goes through the first antenna 3 and the TDD filter 10 are performed simultaneously.

In this case, the first switch 6 is switched to the first connection state. That is to say, in the first switch 6, the connection between the first common terminal 6*a* and the first terminal 6*d* and the connection between the first common terminal 6*a* and the second terminal 6*e* are formed simultaneously. Further, in the second switch 7, the common terminal 7*a* is connected to the selection terminal 7*b*, and the common terminal 7*d* is not connected to the selection terminal 7*b*. Further, in the third switch 8, the common terminal 8*a* is not connected to either the selection terminal 8*b* or 8*c*. Further, in the fourth switch 9, the common terminal 9*a* is connected to the selection terminal 9*b*.

Then, as illustrated in FIG. 2, with the foregoing connection states, a reception signal received by the first antenna 3 is sent along the signal path S0 from the first antenna 3 through the first switch 6, the reception filter 17R, the fourth switch 9, and the first low-noise amplifier 14, and is output from the external terminal 5*d* to the signal processing circuit 2 (normal reception). Then, the reception signal output to the signal processing circuit 2 is subjected to signal processing in the signal processing circuit 2. Along with this, a transmission signal is input to the external terminal 5*e* of the radio frequency module 1 from the output part of the signal processing circuit 2. Then, the transmission signal is sent along the signal path S1 from the external terminal 5*e* through the first power amplifier 13, the second switch 7, the TDD filter 10, and the first switch 6, and is transmitted from the first antenna 3 (normal transmission).

During the state of the normal communication described above, once the first antenna 3 receives, as a reception signal, a SRS request signal, the determination part 221 determines that that reception signal is the SRS request signal. Then, depending on a result of the foregoing determination of the determination part 221, the SRS generation part 222 generates SRS. A generated SRS is input to the external terminal 5*e* of the radio frequency module 1 from the output part of the signal processing circuit 2. Then, the transmission control part 223 controls the first switch 6 and the second switch 7 via the controller 16 in such a manner as to transmit SRS, which was input to the external terminal 5*e*, from each of the first antenna 3, the second antenna 4, and the third antenna 19 sequentially.

Next, referring to FIG. 2 to FIG. 4, the operation is described for the case where SRS is transmitted from each of the first antenna 3, the second antenna 4, and the third antenna 19 sequentially.

With the connection states illustrated in FIG. 2 (that is, the connection states of the foregoing normal communication), in the state where the foregoing normal reception using the signal path S0 is being performed, the foregoing normal transmission using the signal path S1 is stopped, and instead of this normal transmission, SRS is transmitted using the signal path S1. That is to say, along with the foregoing normal reception, SRS is input to the external terminal 5*e* of the radio frequency module 1 from the signal processing circuit 2, and an input SRS is sent through the signal path S1 and transmitted from the first antenna 3 (transmission of SRS).

Then, upon transmission of SRS from the first antenna 3, the connection states of the first switch 6, the second switch 7, the third switch 8, and the fourth switch 9 are switched from the connection states illustrated in FIG. 2 to the connection states illustrated in FIG. 3. More specifically, the first switch 6 is switched from the first connection state (see FIG. 2) to the second connection state (see FIG. 3). As illustrated in FIG. 3, in the second connection state of the first switch 6, the connection between the first common terminal 6*a* and the first terminal 6*d*, the connection between the first common terminal 6*a* and the second terminal 6*e*, and the connection between the second common terminal 6*b* and the third terminal 6*f* are formed simultaneously. Further, in the second switch 7, the common terminal 7*a* is connected to the selection terminal 7*c*, and the common terminal 7*d* is not connected to the selection terminal 7*c*. Further, in the third switch 8, the common terminal 8*a* is not connected to either the selection terminal 8*b* or 8*c*. In the fourth switch 9, the common terminal 9*a* is connected to the selection terminal 9*b*.

Then, as illustrated in FIG. 3, with the foregoing connection states, SRS input to the external terminal 5*e* from the signal processing circuit 2 is sent along a signal path S2 from the external terminal 5*e* through the first power amplifier 13, the second switch 7, the transmission filter 11, the first switch 6, and the second antenna 4, and is transmitted from the second antenna 4 (transmission of SRS). Along with this, a reception signal received by the first antenna 3 is sent along the signal path S0 from the first antenna 3 through the first switch 6, the reception filter 17R, the fourth switch 9, and the first low-noise amplifier 14, and is output from the external terminal 5*d* to the signal processing circuit 2 (normal reception).

Then, upon transmission of SRS from the second antenna 4, the connection state of the first switch 6 is switched from the second connection state (see FIG. 3) to the third connection state (see FIG. 4). As illustrated in FIG. 4, in the third connection state of the first switch 6, the connection between the first common terminal 6*a* and the first terminal 6*d*, the connection between the first common terminal 6*a* and the second terminal 6*e*, and the connection between the third common terminal 6*c* and the third terminal 6*f* are formed simultaneously. The connection states of the second switch 7, the third switch 8, and the fourth switch 9 are the same as the connection states illustrated in FIG. 3.

As illustrated in FIG. 4, with the foregoing connection states, SRS input to the external terminal 5*e* from the signal processing circuit 2 is sent along a signal path S3 from the external terminal 5*e* through the first power amplifier 13, the second switch 7, the transmission filter 11, the first switch 6, and the foregoing another circuit board, and is transmitted from the third antenna 19 (transmission of SRS). Along with this, a reception signal received by the first antenna 3 is sent along the signal path S0 from the first antenna 3 through the first switch 6, the reception filter 17R, the fourth switch 9, and the first low-noise amplifier 14, and is output from the external terminal 5*d* to the signal processing circuit 2 (normal reception).

As described above, the transmission of SRS is performed simultaneously with the normal communication (normal reception in the embodiment 1). Then, SRS is transmitted from each of all the antennas available for transmitting SRS (the first antenna 3, the second antenna 4, and the third antenna 19 in the embodiment 1) sequentially. At this time, at the time of switching the transmission path of SRS from the signal path S1 to the signal path S2 to the signal path S3 sequentially, the connection between the first common terminal 6*a* and the first terminal 6*d* and the connection between the first common terminal 6*a* and the second terminal 6e are maintained. Because of this, while SRS is being transmitted from each of the first antenna 3, the second antenna 4, and the third antenna 19 sequentially, it becomes possible to suppress variation of the load connected to the filter 12 used in the normal reception (the first antenna 3 connected to the first common terminal 6a and the TDD filter 10 connected to the second terminal 6e). As a result, even assuming the transmission of SRS and the foregoing normal communication (the foregoing normal reception in the embodiment 1) are performed simultaneously, in the normal communication, performance loss (for example, a decrease in throughput) caused by the load variation of the filter 12 can be suppressed.

Note that in the foregoing description of the operation, the example is described in which a reception filter (for example, 17R) of the filter 12 is used. However, of the filter 12, a transmission filter (for example, 17T) may alternatively be used. In this case, the transmission of SRS is performed simultaneously with the normal transmission using the transmission filter 17T. Even in this case, effects similar to the case where the reception filter is used are obtained.

(5) Effects

As described above, the radio frequency module 1 according to the embodiment 1 includes the first antenna terminal 5a, the second antenna terminal 5b, the TDD filter 10, the transmission filter 11, the filter 12, and the first switch 6. The TDD filter 10 includes a pass band of the first band. The filter 12 includes a pass band of the second band that is different from the TDD filter 10 and the transmission filter 11. The first switch 6 has the first common terminal 6a, the second common terminal 6b, the first terminal 6d, the second terminal 6e, and the third terminal 6f. The first common terminal 6a is connected to the first antenna terminal 5a. The second common terminal 6b is connected to the second antenna terminal 5b. The first terminal 6d is connectable to the first common terminal 6a. The second terminal 6e is connectable to the first common terminal 6a and the second common terminal 6b. The third terminal 6f is connectable to the second common terminal 6b. The filter 12 is connected to the first terminal 6d. The TDD filter 10 is connected to the second terminal 6e. The transmission filter 11 is connected to the third terminal 6f. The first switch 6 is configured to be able to switch between the first connection state and the second connection state. The first connection state connects the first common terminal 6a to the first terminal 6d and the first common terminal 6a to the second terminal 6e simultaneously. The second connection state connects the first common terminal 6a to the first terminal 6d, the first common terminal 6a to the second terminal 6e, and the second common terminal 6b to the third terminal 6f simultaneously. The transmission filter 11 includes a pass band of the first band.

According to this configuration, at the time of outputting SRS from each of the first common terminal 6a and the second common terminal 6b sequentially, first, with the first connection state of the first switch 6, SRS is output to the first common terminal 6a from the TDD filter 10 via the first switch 6. Then, next, with the second connection state of the first switch 6, SRS is output to the second common terminal 6b from the transmission filter 11 via the first switch 6. At this time, in the first switch 6, in any of the first connection state and the second connection state, the connection between the first common terminal 6a and the first terminal 6d and the connection between the first common terminal 6a and the second terminal 6e are formed simultaneously. That is to say, in any of the first connection state and the second connection state of the first switch 6, the filter 12 is connected to the first antenna 3, which is connected to the first common terminal 6a, and the TDD filter 10, which is connected to the second terminal 6e. Because of this, in any of the first connection state and the second connection state of the first switch 6, the load connected to the filter 12 (the first antenna 3 connected to the first common terminal 6a and the TDD filter 10 connected to the second terminal 6e) is the same. Accordingly, at the time of outputting SRS from each of the first common terminal 6a and the second common terminal 6b sequentially, the load variation of the filter 12 can be suppressed. As a result, even assuming the transmission of SRS and the communication with a normal radio frequency signal (communication using the signal path S0 that connects the filter 12 to the first common terminal 6a) are performed simultaneously, in the communication with a normal radio frequency signal, a decrease in throughput caused by the load variation of the filter 12 can be suppressed. That is to say, the decrease in the throughput of communication with a normal radio frequency signal can be suppressed.

Further, even assuming the transmission of SRS and the reception using the filter 12, which is performed as the communication with a normal radio frequency signal, are performed simultaneously, during the foregoing communication with a normal radio frequency signal, the filter 12 can suppress the decrease in the throughput caused by the load variation of the filter 12.

Further, even assuming the transmission that uses the filter 12 is performed as the communication with a normal radio frequency signal simultaneously with the transmission of SRS, the filter 12 can suppress the decrease in throughput caused by the load variation of the filter 12 during the foregoing communication with a normal radio frequency signal.

The radio frequency module 1 according to the embodiment 1, the first power amplifier 13 and the second switch 7 are further included, and the second switch 7 is configured to be able to switch between connecting the first power amplifier 13 to the TDD filter 10 and connecting the first power amplifier 13 to the transmission filter 11. Because of this, a single power amplifier (the first power amplifier 13) can be shared as the power amplifier for use in the transmission of SRS and the power amplifier for use in the communication with a normal radio frequency signal (communication using the signal path S1 that connects the TDD filter 10 to the first common terminal 6a).

(6) Modified Examples

Next, modified examples of the embodiment 1 are described. In the following description, in some cases, the part of the description that is same as the embodiment 1 is omitted, and the part different from the embodiment 1 is described. Further, the embodiment 1 and the following modified examples can be combined for implementation.

(6-1) Modified Example 1

Figure 5:
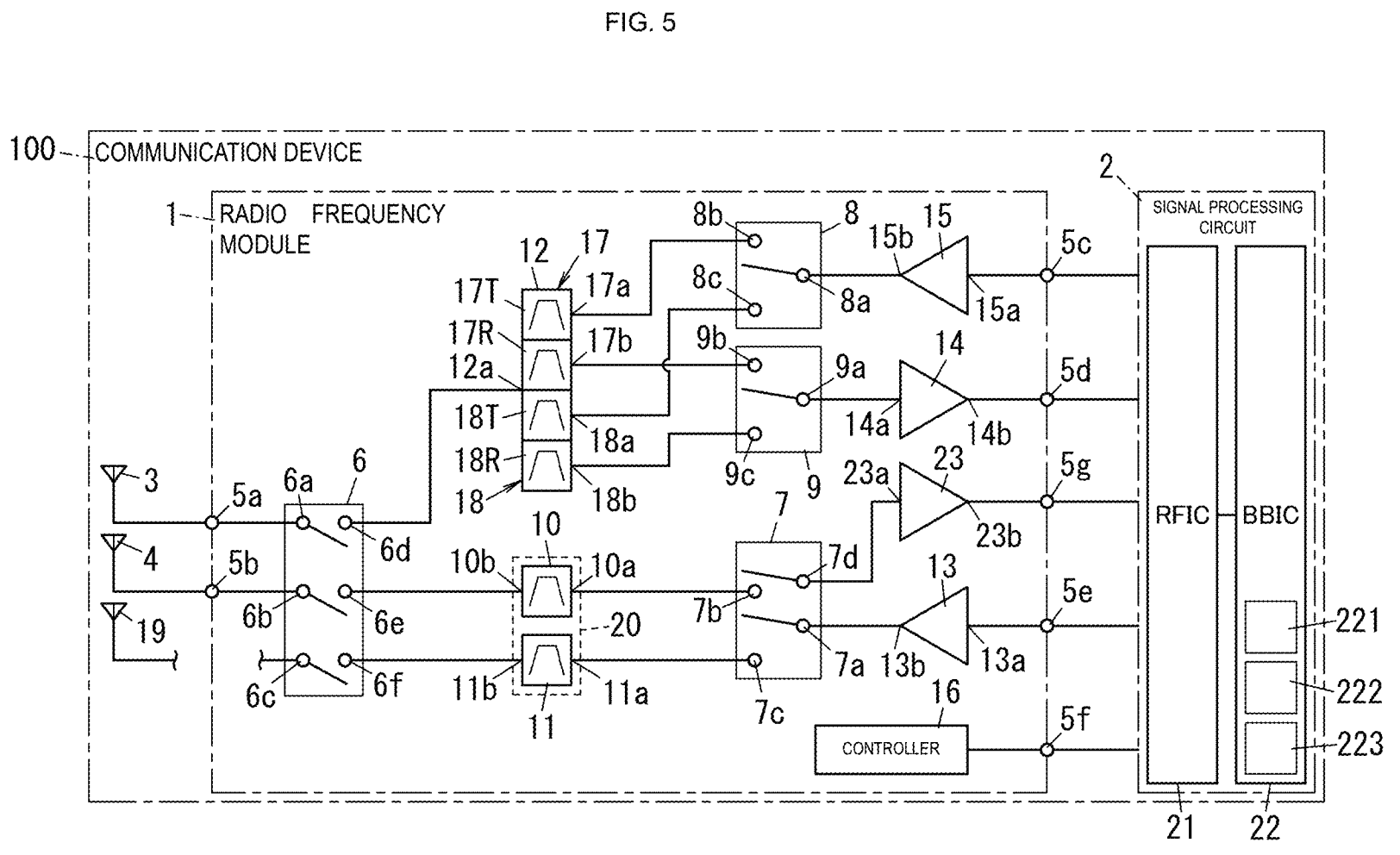

As illustrated in FIG. 5, in the foregoing embodiment 1, the TDD filter 10 and the transmission filter 11 may be included in a single component 20 (for example, an IC chip). According to this configuration, the TDD filter 10 and the transmission filter 11 can be fabricated in the same fabrication step. Because of this, in the TDD filter 10 and the transmission filter 11, variation in impedance caused by fabrication variation can be suppressed.

(6-2) Modified Example 2

In the embodiment 1, in the case where SRS is to be transmitted while the normal transmission using the signal path S1 is being performed (see FIG. 2), SRS is transmitted after stopping the foregoing normal transmission. However, the normal transmission using the signal path S1 and the transmission of SRS may be performed simultaneously by performing time division duplexing of the normal transmission and the transmission of SRS using the TDD filter 10.

Embodiment 2

Figure 6:
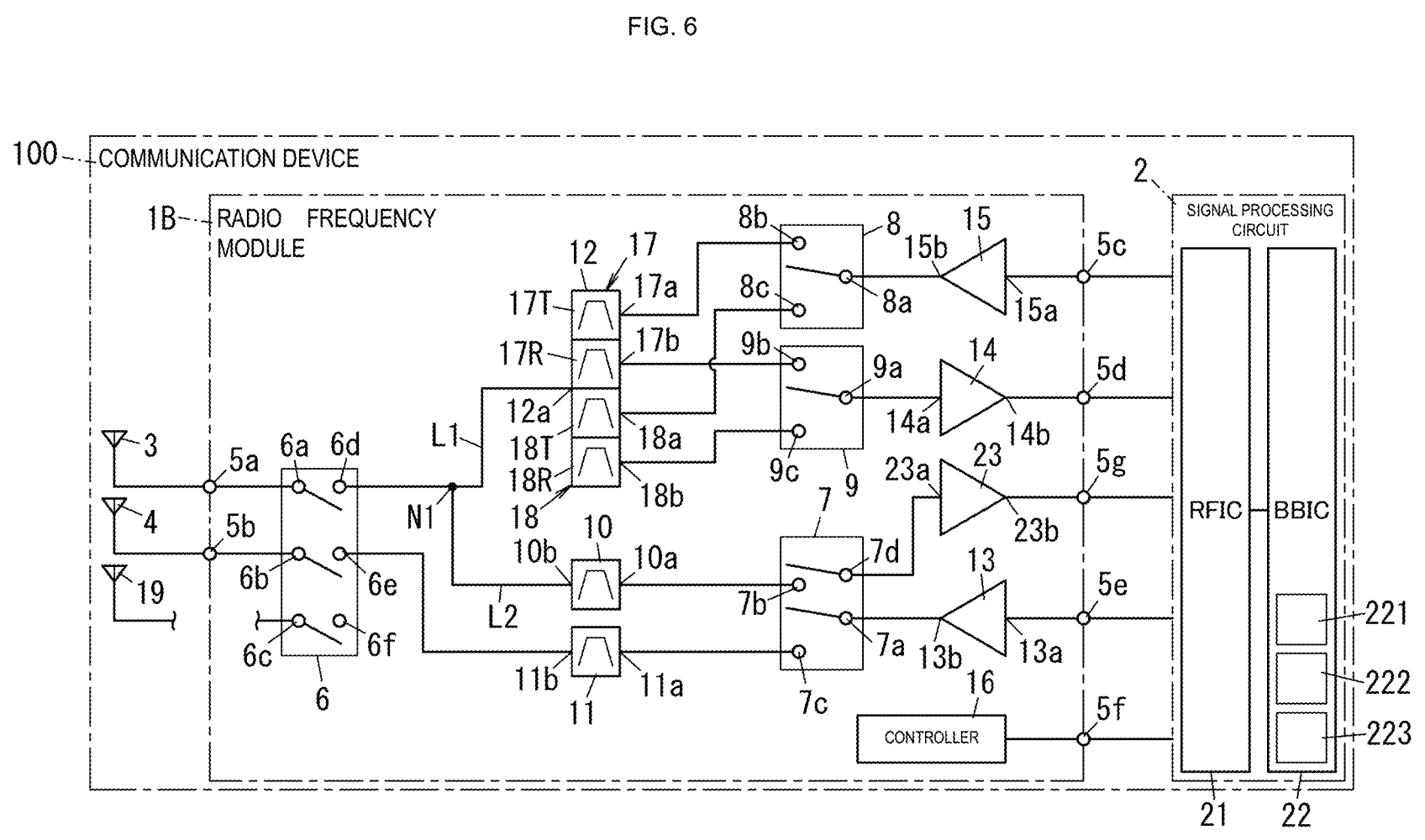

Referring to FIG. 6, a radio frequency module 1B according to the embodiment 2 is described. In the following description, in some cases, same reference characteristics are attached to same constituent elements as those of the embodiment 1, and parts different from the embodiment 1 are described.

(1) Description of Configuration of Radio Frequency Module 1B

The radio frequency module 1B according to the embodiment 2 is different from the radio frequency module 1 according to the embodiment 1 in that the TDD filter 10 is connected to the first terminal 6d of the first switch 6 together with the filter 12 (that is to say, the TDD filter 10 and the filter 12 are connected to the first terminal 6d).

More specifically, the first switch 6 of the radio frequency module 1B has the same configuration as the first switch 6 of the embodiment 1 and has the first common terminal 6a, the second common terminal 6b, and the third common terminal 6c, the first terminal 6d, the second terminal 6e, and the third terminal 6f. In the embodiment 2, the third terminal 6f is not necessarily included. The first common terminal 6a is connected to the first antenna 3, and the second common terminal 6b is connected to the second antenna 4. The third common terminal 6c is the SRS output terminal and is connected to the third antenna 19 via the foregoing another circuit board, as is the case with the third common terminal 6c of the embodiment 1. The first terminal 6d is connected to the input/output part 12a of the filter 12. The first terminal 6d is connectable to the first common terminal 6a. The second terminal 6e is connected to the output part 11b of the transmission filter 11. The second terminal 6e is connectable to the second common terminal 6b.

The first switch 6 of the embodiment 2 is configured to be able to switch between the first connection state, the second connection state, and the third connection state. The first connection state is the connection state in which the first common terminal 6a is connected to the first terminal 6d (see FIG. 7). The second connection state is the connection state in which the connection between the first common terminal 6a and the first terminal 6d and the connection between the second common terminal 6b and the second terminal 6e are formed simultaneously (see FIG. 8). The third connection state is the connection state in which the connection between the first common terminal 6a and the first terminal 6d and the connection between the third common terminal 6c and the second terminal 6e are formed simultaneously (see FIG. 9).

The TDD filter 10 of the radio frequency module 1B is connected between the selection terminal 7b of the second switch 7 and a branch point N1 of a first path L1 that connects the first terminal 6d of the first switch 6 to the input/output part 12a of the filter 12. That is to say, the TDD filter 10 is connected in a second path L2 that branches off from the branch point N1 of the first path L1. In other words, both the TDD filter 10 and the filter 12 are connected to the first terminal 6d of the first switch 6.

(2) Description of Operation of Radio Frequency Module 1B

Figure 7:
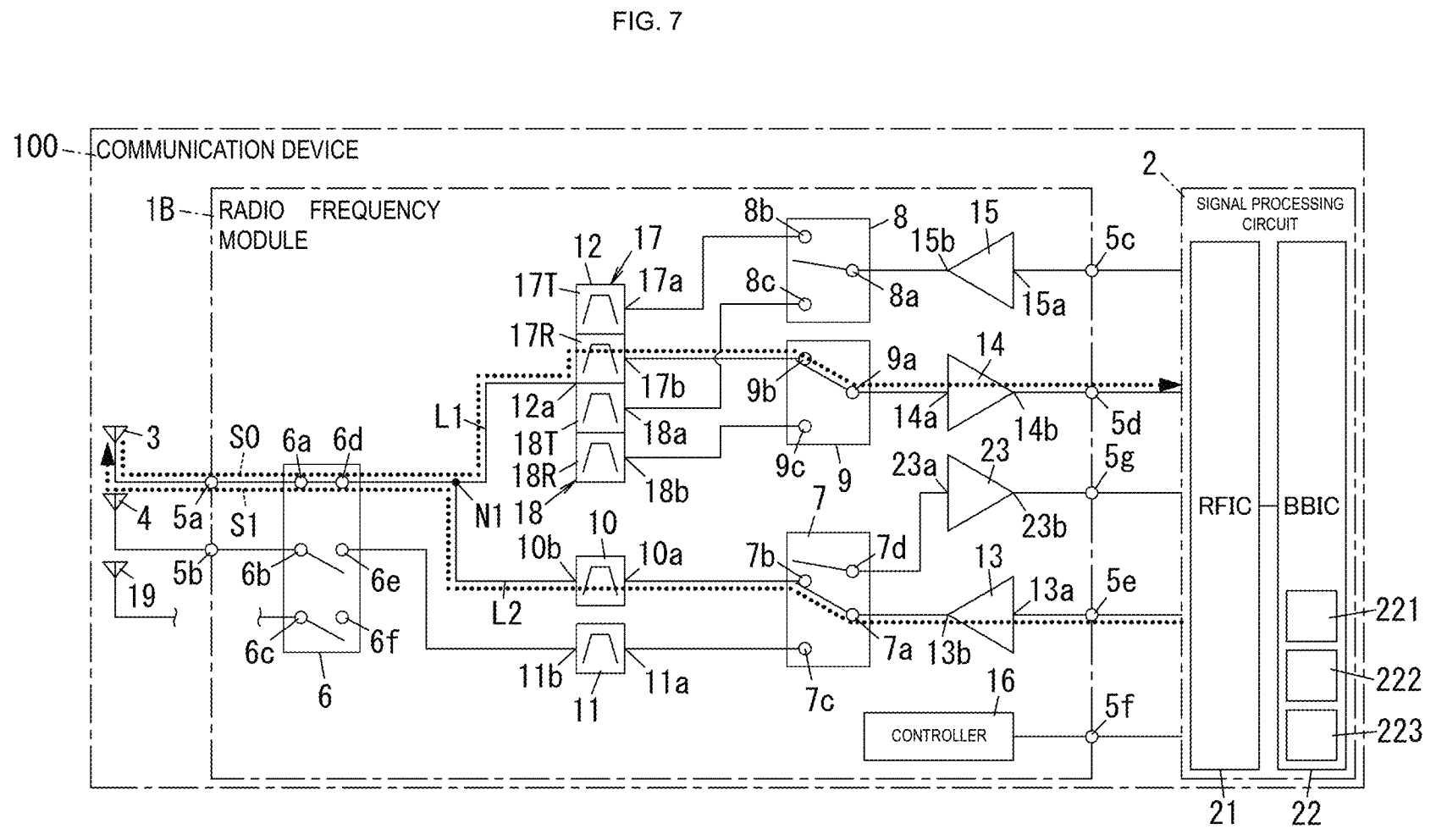
Figure 8:
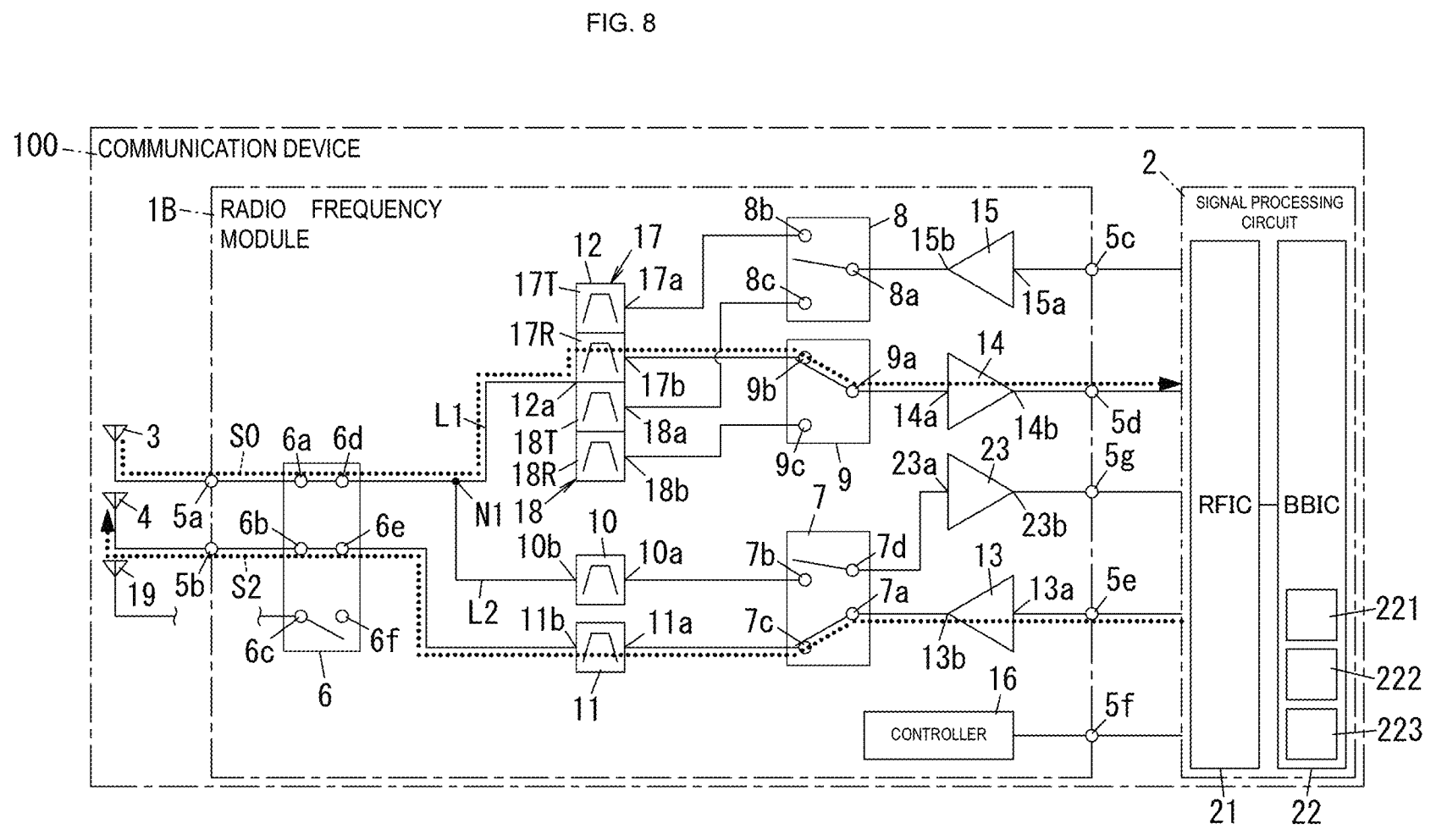
Figure 9:
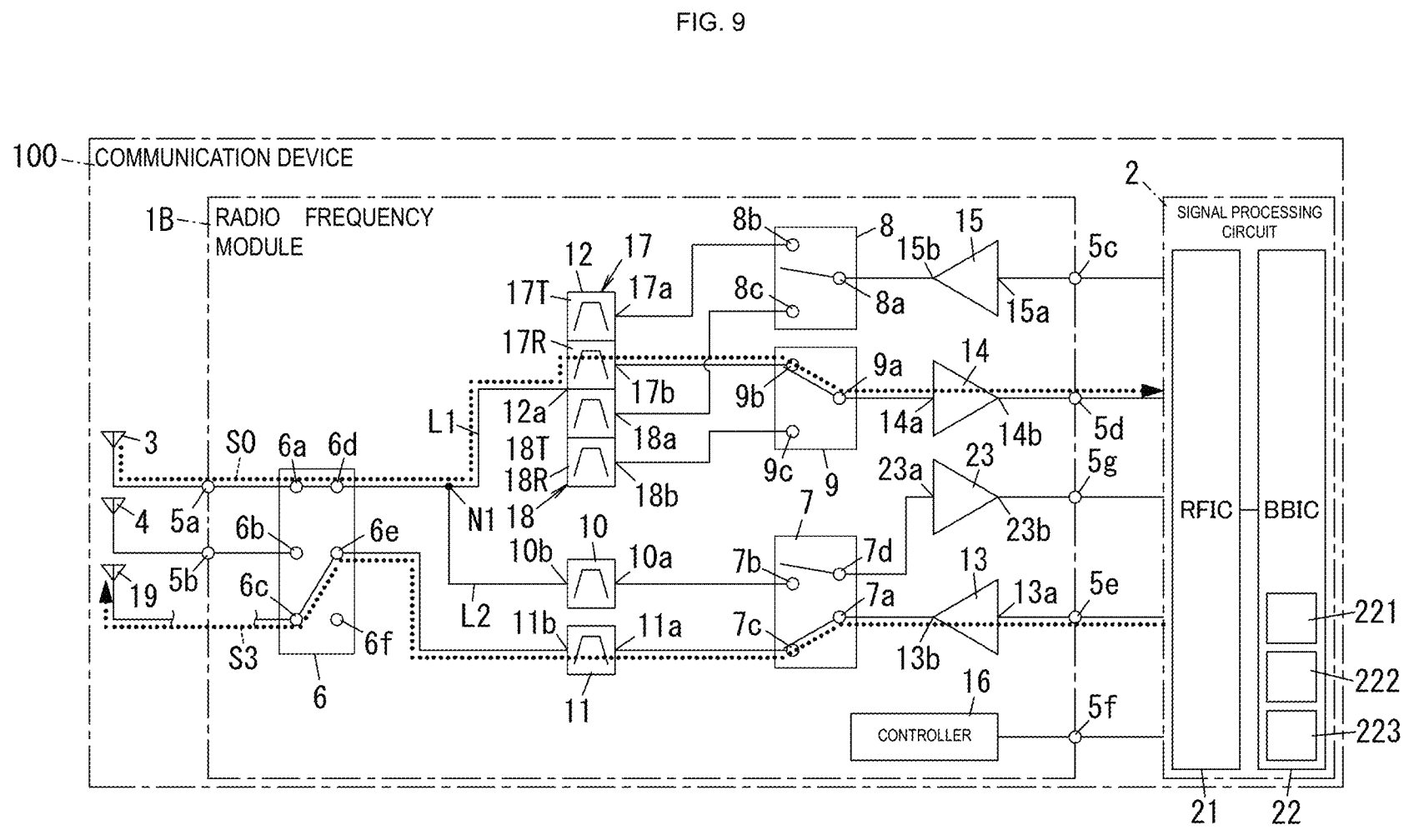

Next, referring to FIG. 7 to FIG. 9, the operation at the time of transmitting SRS is described.

Referring to FIG. 7, first, an exemplary operation is described for the case where the normal transmission and the normal reception are performed simultaneously as the normal communication. More specifically, the exemplary operation is described for the case where the normal reception using the signal path S0 that goes through the first antenna 3 and the reception filter 17R and the normal transmission using the signal path S1 that goes through the first antenna 3 and the TDD filter 10 are performed simultaneously.

In this case, the first switch 6 is switched to the first connection state. That is to say, in the first switch 6, the first common terminal 6a is connected to the first terminal 6d. Further, in the second switch 7, the common terminal 7a is connected to the selection terminal 7b. Further, in the third switch 8, the common terminal 8a is not connected to either the selection terminal 8b or 8c. Further, in the fourth switch 9, the common terminal 9a is connected to the selection terminal 9b.

Then, as illustrated in FIG. 7, with the foregoing connection states, a reception signal received by the first antenna 3 is sent along the signal path S0 from the first antenna 3 through the first switch 6, the reception filter 17R, the fourth switch 9, and the first low-noise amplifier 14, and is output from the external terminal 5d to the signal processing circuit 2 (normal reception). Then, the reception signal output to the signal processing circuit 2 is subjected to signal processing in the signal processing circuit 2. Along with this, a transmission signal is input to the external terminal 5e of the radio frequency module 1 from the output part of the signal processing circuit 2. Then, the transmission signal is sent along the signal path S1 from the external terminal 5e through the first power amplifier 13, the second switch 7, the TDD filter 10, and the first switch 6, and is transmitted from the first antenna 3 (normal transmission).

Next, referring to FIG. 7 to FIG. 9, the operation is described for the case where SRS is transmitted from each of the first antenna 3, the second antenna 4, and the third antenna 19 sequentially.

With the connection states illustrated in FIG. 7 (that is, the connection states of the foregoing normal communication), in the state where the foregoing normal reception using the signal path S0 is being performed, the foregoing normal transmission using the signal path S1 is stopped, and instead of this normal transmission, SRS is transmitted using the signal path S1. That is to say, along with the foregoing normal reception, SRS is input to the external terminal 5e of the radio frequency module 1 from the signal processing circuit 2, and an input SRS is sent through the signal path S1 and transmitted from the first antenna 3 (transmission of SRS).

Then, upon transmission of SRS from the first antenna 3, the connection states of the first switch 6, the second switch 7, the third switch 8, and the fourth switch 9 are switched from the connection states illustrated in FIG. 7 to the connection states illustrated in FIG. 8. More specifically, the first switch 6 is switched from the first connection state (see FIG. 7) to the second connection state (see FIG. 8). As illustrated in FIG. 8, in the second connection state of the first switch 6, the connection between the first common terminal 6a and the first terminal 6d and the connection between the second common terminal 6b and the second terminal 6e are formed simultaneously. Further, in the second switch 7, the common terminal 7a is connected to the selection terminal 7c. Further, in the third switch 8, the common terminal 8a is not connected to either the selection terminal 8b or 8c. In the fourth switch 9, the common terminal 9a is connected to the selection terminal 9b.

Then, as illustrated in FIG. 8, with the foregoing connection states, SRS input to the external terminal 5e from the signal processing circuit 2 is sent along a signal path S2 from the external terminal 5e through the first power amplifier 13, the second switch 7, the transmission filter 11, and the first switch 6, and is transmitted from the second antenna 4 (transmission of SRS). Along with this, a reception signal received by the first antenna 3 is sent along the signal path S0 from the first antenna 3 through the first switch 6, the reception filter 17R, the fourth switch 9, and the first low-noise amplifier 14, and is output from the external terminal 5d to the signal processing circuit 2 (normal reception).

Then, upon transmission of SRS from the second antenna 4, the connection state of the first switch 6 is switched from the second connection state (see FIG. 8) to the third connection states (see FIG. 9). As illustrated in FIG. 9, in the third connection state of the first switch 6, the connection between the first common terminal 6a and the first terminal 6d and the connection between the third common terminal 6c and the second terminal 6e are formed simultaneously. The connection states of the second switch 7, the third switch 8, and the fourth switch 9 are the same as the connection stats illustrated in FIG. 8.

As illustrated in FIG. 9, with the foregoing connection states, SRS input to the external terminal 5e from the signal processing circuit 2 is sent along the signal path S3 from the external terminal 5e through the first power amplifier 13, the second switch 7, the transmission filter 11, and the first switch 6, and is transmitted from the third antenna 19 (transmission of SRS). Along with this, a reception signal received by the first antenna 3 is sent along the signal path S0 from the first antenna 3 through the first switch 6, the reception filter 17R, the fourth switch 9, and the first low-noise amplifier 14, and is output from the external terminal 5d to the signal processing circuit 2 (normal reception).

As described above, the transmission of SRS is performed simultaneously with the normal reception (normal reception in the embodiment 1). Then, SRS is transmitted from each of all the antennas available for transmitting SRS (the first antenna 3, the second antenna 4, and the third antenna 19) sequentially. At this time, at the time of switching the transmission path of SRS from the signal path S1 to the signal path S2 to the signal path S3 sequentially, the connection between the first common terminal 6a and the first terminal 6d is maintained. Because of this, while SRS is being transmitted from each antenna (the first antenna 3, the second antenna 4, and the third antenna 19) sequentially, it becomes possible to suppress variation of the load connected to the filter 12 used in the normal reception (the first antenna 3 and the TDD filter 10). As a result, even assuming the transmission of SRS and the foregoing normal reception are performed simultaneously, in the normal communication, performance loss (for example, a decrease in throughput) caused by the load variation of the filter 12 can be suppressed.

(3) Effects

The radio frequency module 1B according to the embodiment 2 includes the first antenna terminal 5a, the second antenna terminal 5b, the TDD filter 10, the transmission filter 11, the filter 12, and the first switch 6. The TDD filter 10 includes a pass band of the first band. The filter 12 has a pass band including the second band that is different from the TDD filter 10 and the transmission filter 11. The first switch 6 has the first common terminal 6a, the second common terminal 6b, the first terminal 6d, and the second terminal 6e. The filter 12 and the TDD filter 10 are connected to the first terminal 6d. The transmission filter 11 is connected to the second terminal 6e. The first switch 6 is configured to be able to switch between the first connection state and the second connection state. The first connection state connects the first common terminal 6a to the first terminal 6d. The second connection state connects the first common terminal 6a to the first terminal 6d and the second common terminal 6b to the second terminal 6e simultaneously. The transmission filter 11 includes a pass band of the first band.

According to this configuration, at the time of outputting SRS from each of the first common terminal 6a and the second common terminal 6b sequentially, first, with the first connection state of the first switch 6, SRS is output to the first common terminal 6a from the TDD filter 10 via the first switch 6. Then, next, with the second connection state of the first switch 6, SRS is output to the second common terminal 6b from the transmission filter 11 via the first switch 6. At this time, in the first switch 6, in any of the first connection state and the second connection state, the first common terminal 6a is connected to the first terminal 6d. That is to say, in any of the first connection state and the second connection state of the first switch 6, the filter 12 is connected to the first common terminal 6a and the TDD filter 10. Because of this, the load connected to the filter 12 (the TDD filter 10 and the first antenna 3 connected to the first common terminal 6a) is the same. Accordingly, at the time of outputting SRS from each of the first common terminal 6a and the second common terminal 6b sequentially, the load variation of the filter 12 can be suppressed. As a result, even assuming the transmission of SRS and the communication with a normal radio frequency signal (communication using the signal path S0 that connects the filter 12 to the first common terminal 6a) are performed simultaneously, in the normal communication, a loss of performance (for example, a decrease in throughput) caused by the load variation of the filter 12 can be suppressed. That is to say, the decrease in the throughput of communication with a normal radio frequency signal can be suppressed.

(4) Modified Example

The embodiments 1 to 2 and the modified examples thereof may be combined for implementation.

Aspects

In the present specification, the following aspects are disclosed.

The radio frequency module (1) of a first aspect includes the first antenna terminal (5a), the second antenna terminal (5b), the TDD filter (10), the transmission filter (11), the filter (12), and the first switch (6). The TDD filter (10) includes a pass band of the first band. The filter (12) includes a pass band of the second band that is different from the TDD filter (10) and the transmission filter (11). The first switch (6) has the first common terminal (6a), the second common terminal (6b), the first terminal (6d), the second terminal (6e), and the third terminal (6f). The first common terminal (6a) is connected to the first antenna terminal (5a). The second common terminal (6b) is connected to the second antenna terminal (5b). The first terminal (6d) is connectable to the first common terminal (6a). The second terminal (6e) is connectable to the first common terminal (6a) and the second common terminal (6b). The third terminal (6f) is connectable to the second common terminal (6b). The filter (12) is connected to the first terminal (6d). The TDD filter (10) is connected to the second terminal (6e). The transmission filter (11) is connected to the third terminal (6f). The first switch (6) is configured to be able to switch between the first connection state and the second connection state. The first connection state connects the first common terminal (6a) to the first terminal (6d) and the first common terminal (6a) to the second terminal (6e) simultaneously. The second connection state connects the first common terminal (6a) to the first terminal (6d), the first common terminal (6a) to the second terminal (6e), and the second common terminal (6b) to the third terminal (6f) simultaneously. The transmission filter (11) includes a pass band of the first band.

According to this configuration, at the time of outputting SRS from each of the first common terminal (6a) and the second common terminal (6b) sequentially, first, with the first connection state of the first switch (6), SRS is output to the first common terminal (6a) from the TDD filter (10) via the first switch (6). Then, next, with the second connection state of the first switch (6), SRS is output to the second common terminal (6b) from the transmission filter (11) via the first switch (6). At this time, in the first switch (6), in any of the first connection state and the second connection state, the connection between the first common terminal (6a) and the first terminal (6d) and the connection between the first common terminal (6a) and the second terminal (6e) are formed simultaneously. That is to say, in any of the first connection state and the second connection state of the first switch (6), the filter (12) is connected to the first antenna (3), which is connected to the first common terminal (6a), and the TDD filter (10), which is connected to the second terminal (6e). Because of this, in any of the first connection state and the second connection state of the first switch (6), the load connected to the filter (12) (the first antenna (3) connected to the first common terminal (6a) and the TDD filter (10) connected to the second terminal (6e)) is the same. Accordingly, at the time of outputting SRS from each of the first common terminal (6a) and the second common terminal (6b) sequentially, the load variation of the filter (12) can be suppressed. As a result, even assuming the transmission of SRS and the communication with a normal radio frequency signal (communication using the signal path (S0) that connects the filter (12) to the first common terminal (6a)) are performed simultaneously, in the communication with a normal radio frequency signal, a loss of performance (for example, a decrease in throughput) caused by the load variation of the filter (12) can be suppressed. That is to say, the decrease in the throughput of communication with a normal radio frequency signal can be suppressed.

The radio frequency module (1B) of a second aspect includes the first antenna terminal (5a), the second antenna terminal (5b), the TDD filter (10), the transmission filter (11), the filter (12), and the first switch (6). The TDD filter (10) includes a pass band of the first band. The filter (12) includes a pass band of the second band that is different from the TDD filter (10) and the transmission filter (11). The first switch (6) has the first common terminal (6a), the second common terminal (6b), the first terminal (6d), and the second terminal (6e). The first common terminal (6a) is connected to the first antenna terminal (5a). The second common terminal (6b) is connected to the second antenna terminal (5b). The first terminal (6d) is connectable to the first common terminal (6a). The second terminal (6e) is connectable to the second common terminal (6b). The filter (12) and the TDD filter (10) are connected to the first terminal (6d). The transmission filter (11) is connected to the second terminal (6e). The first switch (6) is configured to be able to switch between the first connection state and the second connection state. The first connection state connects the first common terminal (6a) to the first terminal (6d). The second connection state connects the first common terminal (6a) to the first terminal (6d) and the second common terminal (6b) to the second terminal (6e) simultaneously. The transmission filter (11) includes a pass band of the first band.

According to this configuration, at the time of outputting SRS from each of the first common terminal (6a) and the second common terminal (6b) sequentially, first, with the first connection state of the first switch (6), SRS is output to the first common terminal (6a) from the TDD filter (10) via the first switch (6). Then, next, with the second connection state of the first switch (6), SRS is output to the second common terminal (6b) from the transmission filter (11) via the first switch (6). At this time, in the first switch (6), in any of the first connection state and the second connection state, the first common terminal (6a) is connected to the first terminal (6d). That is to say, in any of the first connection state and the second connection state of the first switch (6), the filter (12) is connected to the first common terminal (6a) and the TDD filter (10). Because of this, the load connected to the filter (12) (the TDD filter 10 and the first antenna (3) connected to the first common terminal (6a)) is the same. Accordingly, at the time of outputting SRS from each of the first common terminal (6a) and the second common terminal (6b) sequentially, the load variation of the filter (12) can be suppressed. As a result, even assuming the transmission of SRS and the normal communication (communication using the signal path (S0) that connects the filter (12) to the first common terminal (6a)) are performed simultaneously, in the communication with a normal radio frequency signal, a loss of performance (for example, a decrease in throughput) caused by the load variation of the filter (12) can be suppressed. That is to say, the decrease in the throughput of communication with a normal radio frequency signal can be suppressed.

In the radio frequency module (1;1B) of a third aspect, the TDD filter (10) and the transmission filter (11) of the first or second aspect are configured in such a manner as to be included in a single component (20).

According to this configuration, variation in impedance caused by fabrication variation can be suppressed in the TDD filter (10) and the transmission filter (11).

In the radio frequency module (1;1B) of a fourth aspect, the filter (12) in one of the first to third aspects is a FDD filter.

According to this configuration, even assuming the frequency division duplexing using the filter (12) is performed as the normal communication simultaneously with the transmission of SRS, the decrease in throughput caused by the load variation of the filter (12) can be suppressed during the foregoing normal communication.

In the radio frequency module (1;1B) of a fifth aspect, the filter (12) in one of the first to fourth aspects has reception capability.

According to this configuration, even assuming the reception using the filter (12) is performed as the normal communication simultaneously with the transmission of SRS, the decrease in throughput caused by the load variation of the filter (12) can be suppressed during the foregoing normal communication.

In the radio frequency module (1;1B) of a sixth aspect, the filter (12) in one of the first to fifth aspects has transmission capability.

According to this configuration, even assuming the transmission using the foregoing filter (12) is performed as the normal communication simultaneously with the transmission of SRS, the decrease in throughput caused by the load variation of the filter (12) can be suppressed during the foregoing normal communication.

In the radio frequency module (1) of a seventh aspect, the power amplifier (13) and the second switch (7) are further included in one of the first to sixth aspects. The second switch (7) is configured to be able to switch between connecting the power amplifier (13) to the TDD filter (10) and connecting the power amplifier (13) to the transmission filter (11).

According to this configuration, the power amplifier (13) can be shared as the power amplifier for use in the transmission of SRS and the power amplifier for use in the normal communication (communication using the signal path (S0) that connects the filter (12) and the first common terminal (6a)).

The communication device (100) of an eighth aspect includes the radio frequency module (1;1B) of any one of the first to seventh aspects and the signal processing circuit (2). The signal processing circuit (2) is connected to the radio frequency module (1;1B) and performs signal processing on a radio frequency signal.

According to this configuration, it becomes possible to provide the communication device (100) that produces the advantageous effects of the radio frequency module (1;1B).

What is claimed is:

1. A radio frequency module comprising:
a first antenna terminal;
a second antenna terminal;
a Time Division Duplex (TDD) filter including a pass band of a first band;
a transmission filter;
a filter including a pass band of a second band that is different from the TDD filter and the transmission filter; and
a first switch having a first common terminal connected to the first antenna terminal, a second common terminal connected to the second antenna terminal, a first terminal connectable to the first common terminal, a second terminal connectable to the first common terminal and the second common terminal, and a third terminal connectable to the second common terminal, wherein
the filter is connected to the first terminal,
the TDD filter is connected to the second terminal,
the transmission filter is connected to the third terminal, the first switch is configured to be able to switch between
a first connection state that connects the first common terminal to the first terminal and the first common terminal to the second terminal simultaneously, and
a second connection state that connects the first common terminal to the first terminal, the first common terminal to the second terminal, and the second common terminal to the third terminal simultaneously, and
the transmission filter includes a pass band of the first band.

2. The radio frequency module according to claim 1, wherein
the TDD filter and the transmission filter are included in a single component.

3. The radio frequency module according to claim 1, wherein
the filter is a Frequency Division Duplex (FDD) filter.

4. The radio frequency module according to claim 1, wherein
the filter has reception capability.

5. The radio frequency module according to claim 1, wherein
the filter has transmission capability.

6. The radio frequency module according to claim 1, further comprising:
a power amplifier; and
a second switch configured to be able to switch between connecting the power amplifier to the TDD filter and connecting the power amplifier to the transmission filter.

7. A communication device comprising:
the radio frequency module according to claim 1; and
a signal processing circuit connected to the radio frequency module, the signal processing circuit performing signal processing on a radio frequency signal.

8. A radio frequency module comprising:
a first antenna terminal;
a second antenna terminal;
a Time Division Duplex (TDD) filter including a pass band of a first band;
a transmission filter;
a filter including a pass band of a second band that is different from the TDD filter and the transmission filter; and
a first switch having a first common terminal connected to the first antenna terminal, a second common terminal connected to the second antenna terminal, a first terminal connectable to the first common terminal, and a second terminal connectable to the second common terminal, wherein
the filter and the TDD filter are connected to the first terminal,
the transmission filter is connected to the second terminal,
the first switch is configured to be able to switch between
a first connection state that connects the first common terminal to the first terminal, and
a second connection state that connects the first common terminal to the first terminal and the second common terminal to the second terminal simultaneously, and
the transmission filter includes a pass band of the first band.

9. The radio frequency module according to claim 8, wherein
the TDD filter and the transmission filter are included in a single component.

10. The radio frequency module according to claim 8, wherein the filter is a Frequency Division Duplex (FDD) filter.

11. The radio frequency module according to claim 8, wherein the filter has reception capability.

12. The radio frequency module according to claim 8, wherein the filter has transmission capability.

13. The radio frequency module according to claim 8, further comprising:

a power amplifier; and a second switch configured to be able to switch between connecting the power amplifier to the TDD filter and connecting the power amplifier to the transmission filter.

14. A communication device comprising:

the radio frequency module according to claim 8; and a signal processing circuit connected to the radio frequency module, the signal processing circuit performing signal processing on a radio frequency signal.

15. A radio frequency module comprising:

a first antenna terminal;

a second antenna terminal;

a first filter including a pass band of a first band;

a second filter different from the first filter;

a third filter including a pass band of a second band that is different from the first filter and the second filter; and a first switch having a first common terminal connected to the first antenna terminal, a second common terminal connected to the second antenna terminal, a first terminal connectable to the first common terminal, a second terminal connectable to the first common terminal and the second common terminal, and a third terminal connectable to the second common terminal, wherein the third filter is connected to the first terminal, the first filter is connected to the second terminal, the second filter is connected to the third terminal, the first switch is configured to be able to switch between a first connection state that connects the first common terminal to the first terminal and the first common terminal to the second terminal simultaneously, and a second connection state that connects the first common terminal to the first terminal, the first common terminal to the second terminal, and the second common terminal to the third terminal simultaneously, and the second filter includes a pass band of the first band.

16. The radio frequency module according to claim 15, wherein the first filter and the second filter are included in a single component.

17. The radio frequency module according to claim 15, wherein the first filter is a Time Division Duplex (TDD) filter, the second filter is a transmission filter, and the third filter is a Frequency Division Duplex (FDD) filter.

18. The radio frequency module according to claim 15, wherein the third filter has reception capability.

19. The radio frequency module according to claim 15, wherein the third filter has transmission capability.

20. The radio frequency module according to claim 15, further comprising:

a power amplifier; and a second switch configured to be able to switch between connecting the power amplifier to the first filter and connecting the power amplifier to the second filter.

* * * * *